(12) United States Patent
Scherpa et al.

(10) Patent No.: US 9,060,033 B2
(45) Date of Patent: Jun. 16, 2015

(54) GENERATION AND CACHING OF CONTENT IN ANTICIPATION OF PRESENTING CONTENT IN WEB CONFERENCES

(75) Inventors: Josef Scherpa, Fort Collins, CO (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/967,474

(22) Filed: Dec. 14, 2010

(65) Prior Publication Data

US 2012/0151336 A1 Jun. 14, 2012

(51) Int. Cl.
| | |
|---|---|
| G06F 17/00 | (2006.01) |
| H04L 29/08 | (2006.01) |
| H04N 7/15 | (2006.01) |
| H04L 12/18 | (2006.01) |
| H04N 21/4788 | (2011.01) |
| G06F 3/0481 | (2013.01) |
| G06Q 10/10 | (2012.01) |
| H04L 12/58 | (2006.01) |
| H04N 1/42 | (2006.01) |

(52) U.S. Cl.
CPC ............. *H04L 67/2842* (2013.01); *H04N 7/15* (2013.01); *H04L 12/1813* (2013.01); *H04N 21/4788* (2013.01); *G06F 3/0481* (2013.01); *G06Q 10/10* (2013.01); *H04L 12/581* (2013.01); *H04N 1/42* (2013.01); *H04L 12/1822* (2013.01); *H04L 12/1827* (2013.01); *H04L 67/02* (2013.01); *H04L 67/289* (2013.01)

(58) Field of Classification Search
CPC ....... H04N 7/15; H04N 1/42; H04N 24/4788; G06Q 10/10; G06F 3/0481; H04L 12/1813; H04L 12/581

USPC .......................................... 715/273, 730–767
See application file for complete search history.

(56) References Cited

U.S. PATENT DOCUMENTS

| | | | | |
|---|---|---|---|---|
| 7,783,979 | B1* | 8/2010 | Leblang et al. | 715/739 |
| 2002/0109697 | A1* | 8/2002 | Gardiner et al. | 345/539 |
| 2002/0184312 | A1* | 12/2002 | Chen et al. | 709/205 |
| 2005/0235216 | A1 | 10/2005 | Kawano | |
| 2006/0080664 | A1* | 4/2006 | Jawahar et al. | 718/100 |

(Continued)

OTHER PUBLICATIONS

Sampath-Kuma et al., "WebPresent—A World Wide Web based telepresentation tool for physicians" pp. 1-11—1997 by Citeseer.*

(Continued)

*Primary Examiner* — Quoc A Tran
(74) *Attorney, Agent, or Firm* — Robert A. Voigt, Jr.; Winstead, P.C.

(57) ABSTRACT

A method, system and computer program product for sharing the contents of a presentation in a web conference. A web conference server in a web conferencing system extracts a document that is likely to be viewed by the presenter during the web conference prior to the presenter actually viewing the document. The web conference server processes the extracted document into a displayable screen image which is sent to the participant computers in the web conference to be cached. When the presenter computer actually displays the extracted document, the web conference server informs the participant computers to display the cached screen image. Since the screen image of the document has already been cached by the participant computers, the document will be more quickly viewed by the participant computers and will reduce the time lag between when the presenter views the document and when the audience views the same content.

12 Claims, 5 Drawing Sheets

(56) References Cited

U.S. PATENT DOCUMENTS

| | | | |
|---|---|---|---|
| 2009/0249222 A1* | 10/2009 | Schmidt et al. | 715/751 |
| 2011/0072365 A1* | 3/2011 | Pall et al. | 715/753 |
| 2011/0173262 A1* | 7/2011 | Kumar | 709/204 |
| 2011/0264745 A1* | 10/2011 | Ferlitsch | 709/205 |
| 2011/0276900 A1* | 11/2011 | Khan et al. | 715/753 |

OTHER PUBLICATIONS

M., Andy, "Screengrab 0.96.3," Mar. 25, 2010, https://addons.mozilla.org/en-US/firefox/addon/1146.

"How to Create a Basic Slide Show," 2010, http://www.javascriptkit.com/howto/show2.shtml.

* cited by examiner

GENERATION AND CACHING OF CONTENT IN ANTICIPATION OF PRESENTING CONTENT IN WEB CONFERENCES

TECHNICAL FIELD

The present invention relates to web conferencing, and more particularly to sharing the content of a presentation in advance of the presenter viewing the content in order to reduce the time lag between when the presenter views the content and when the audience views it on their computer screens.

BACKGROUND

Web conferencing is used to conduct live meetings (known as "e-meetings"), training, or presentations via the Internet. In a web conference, each participant sits at his or her own computer and is connected to other participants via the Internet. Attendees to the web conference may access the conference by clicking on a link distributed by e-mail (meeting invitation) to enter the conference.

Web conferences may involve interaction among the participants, such as between a speaker or a presenter and the audience. The interaction may include polling and question & answer sessions to allow full participation between the audience and the presenter. In some cases, the presenter may speak over a standard telephone line, while pointing out information being presented onscreen, and the audience can respond over their own telephones.

A feature of many web conferences is the ability to share the contents of a presenter's computer screen with the attendees via a web interface and/or the Internet. For example, a presenter may present information to an audience of attendees by sharing the contents of his or her computer screen via a web conferencing tool. The presenter may share the entire desktop area of his or her computer screen or may share only a specific application, such as Microsoft® PowerPoint to show a presentation. By sharing the presenter's computer screen (referred to as "screen sharing"), the attendees are able to view the presenter's computer screen to see the same content the presenter sees.

Screen sharing is currently accomplished using one of the following two methods. The first method involves capturing the screen of the presenter, sending it to the web conference server, which then sends it to the participants. The second method involves the presenter uploading content to be shared (e.g., files, images, etc.) to the web conference server in advance of presenting it. The presenter then controls when and which of the uploaded content to be shared. The web conference server can more quickly send the content to the participant screens since it does not need to be captured from the presenter's screen.

The first method results in a time delay between when the presenter views the materials on his/her computer screen and when the audience views the materials on their computer screens. For example, the presenter may be sharing the bottom part of a document among the audience. When the presenter views the content on the next page of the document, there is a time lag between when the presenter views the next page and when the audience views it on their computer screens. Such a time lag may cause the audience to not follow the presentation of the presenter, especially when the presenter is speaking and pointing out information that is not currently visible for the audience. The second method, while faster, since the screen does not need to be captured from the presenter, does not allow for ad hoc sharing of applications or content from the presenter's screen. Furthermore, there is still a time delay between when the presenter views the content and when the audience views it on their computer screens since the web conference server has to send the content to the participant screens.

BRIEF SUMMARY

In one embodiment of the present invention, a method for sharing the contents of a presentation in a web conference comprises extracting a page or a document that is successive to a currently viewed page or document, respectively, at a presenter computer. The method further comprises processing the extracted successive page or document into a displayable screen image. Additionally, the method comprises sending the displayable screen image to each participant computer to be cached. In addition, the method comprises transmitting, by a web conference server, a message to each participant computer to display the cached displayable screen image in response to a current display thereof by the presenter computer.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for sharing the contents of a presentation in a web conference. In one embodiment of the present invention, a web conference server in a web conferencing system extracts the next page of a document or the next document in a list of documents that is likely to be viewed by the presenter during the web conference prior to the presenter actually viewing that page/document. The web conference server processes the extracted page/document into a displayable screen image. The web conference server sends the displayable screen image to the participant computers in the web conference to be cached. When the presenter computer actually displays the next page of the document or the next document in the list of documents, the web conference server informs the participant computers to display the cached screen image. Since the screen image of the document has already been cached by the participant computers, the document will be more quickly viewed by the participant computers and will reduce the time lag between when the presenter views the next page/document and when the audience views the same content.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
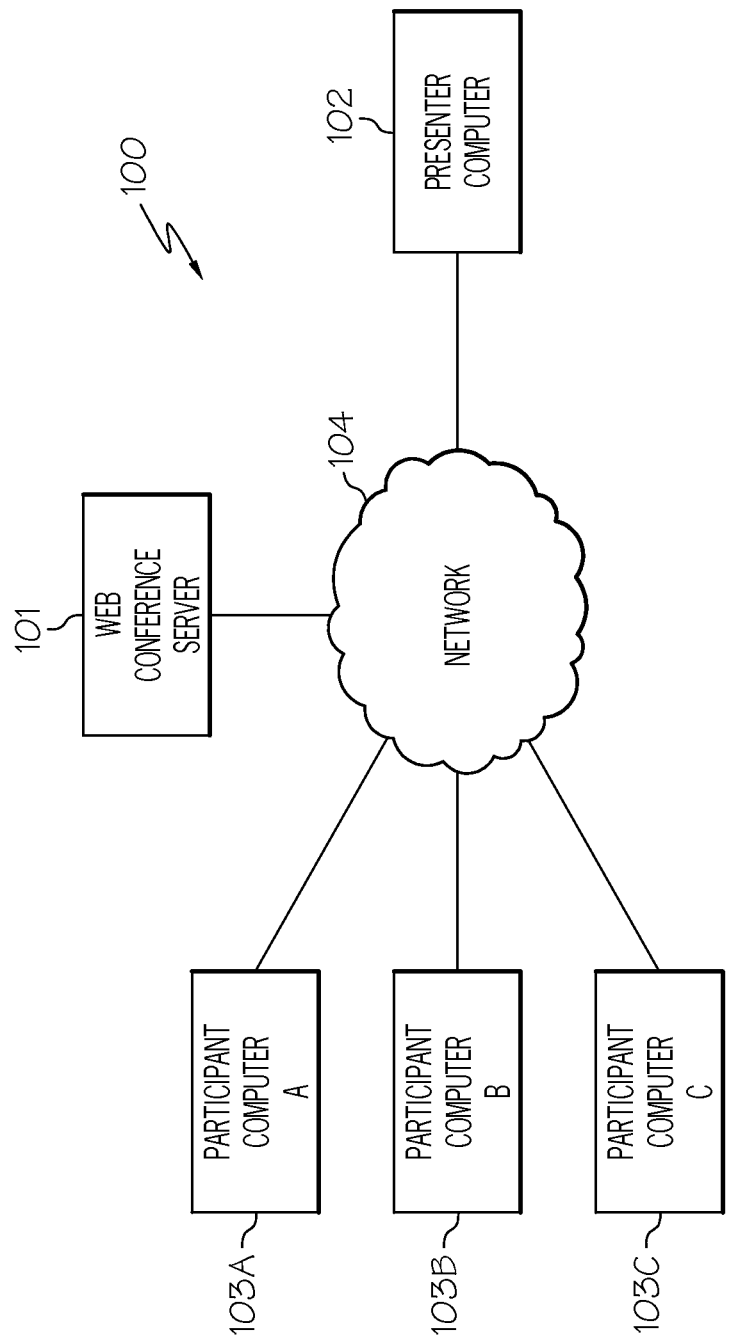
FIG. 1 illustrates a web conferencing system configured in accordance with an embodiment of the present invention.

Referring now to the Figures in detail, FIG. 1 illustrates a web conferencing system 100 configured in accordance with an embodiment of the present invention. Referring to FIG. 1, web conferencing system 100 includes a web conference server 101 which acts as an intermediary between a presenter computer 102 (computer used by the presenter in a web conference) and participant computers 103A-103C (computers used by the audience in the web conference). In one embodiment, web conference server 101 is configured to manage a web conference between the presenter and the audience (other participants to the web conference). A description of one embodiment of a hardware configuration of web conference server 101 is provided below in connection with FIG. 2. Participant computers 103A-103C may collectively or individually be referred to as participant computers 103 or participant computer 103, respectively.

Web conference server 101 communicates with presenter computer 102 and participant computers 103 via a network 104 (e.g., local area network, wide area network). Each of these components may be connected to network 104 by wire or wirelessly.

Presenter computer 102 and participant computers 103 may be any type of computing system, including but not limited to, a desktop computer, a personal digital assistance (PDA), a smartphone, a portable computing unit, and the like.

Web conferencing system 100 is not to be limited in scope to any one particular network architecture and system 100 may include any number of web conference servers 101, presenter computers 102 and participant computers 103.

Figure 2:
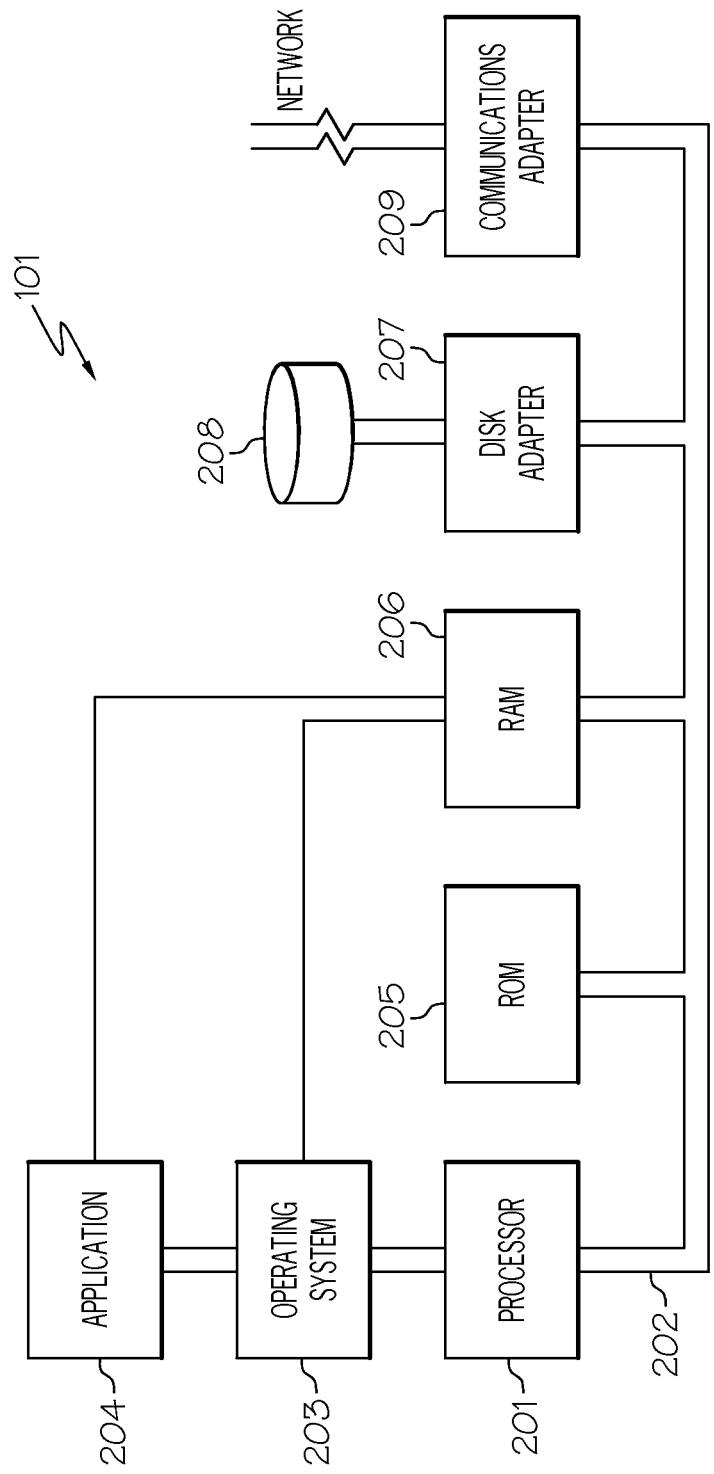
FIG. 2 illustrates a hardware configuration of a web conference server configured in accordance with an embodiment of the present invention.

Referring now to FIG. 2, FIG. 2 illustrates a hardware configuration of a web conference server 101 (FIG. 1) which is representative of a hardware environment for practicing the present invention. Referring to FIG. 2, web conference server 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for sharing the contents of a presentation made by a presenter in a manner where the time lag between when the presenter views the content and when the audience views the same content is reduced, as discussed further below in association with FIGS. 3A-3B and 4.

Referring again to FIG. 2, read-only memory ("ROM") 205 is coupled to system bus 202 and includes a basic input/output system ("BIOS") that controls certain basic functions of web conference server 101. Random access memory ("RAM") 206 and disk adapter 207 are also coupled to system bus 202. It should be noted that software components including operating system 203 and application 204 may be loaded into RAM 206, which may be web conference server's 101 main memory for execution. Disk adapter 207 may be an integrated drive electronics ("IDE") adapter that communicates with a disk unit 208, e.g., disk drive. It is noted that the program for sharing the contents of a presentation made by a presenter in a manner where the time lag between when the presenter views the content and when the audience views the same content is reduced, as discussed further below in association with FIGS. 3A-3B and 4, may reside in disk unit 208 or in application 204.

Web conference server 101 may further include a communications adapter 209 coupled to bus 202. Communications adapter 209 interconnects bus 202 with an outside network (network 104) thereby enabling web conference server 101 to communicate with presenter computer 101 and participant computers 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, during screen sharing in a web conference, there is a time delay between when the presenter views the materials on his/her computer screen and when the audience views the same materials on their computer screens. For example, the presenter may be sharing the bottom part of a document among the audience. When the presenter views the content on the next page of the document, there is a time lag between when the presenter views the next page and when the audience views it on their computer screens. Such a time lag may cause the audience to not follow the presentation of the presenter, especially when the presenter is speaking and pointing out information that is not currently visible for the audience.

Figure 3A:
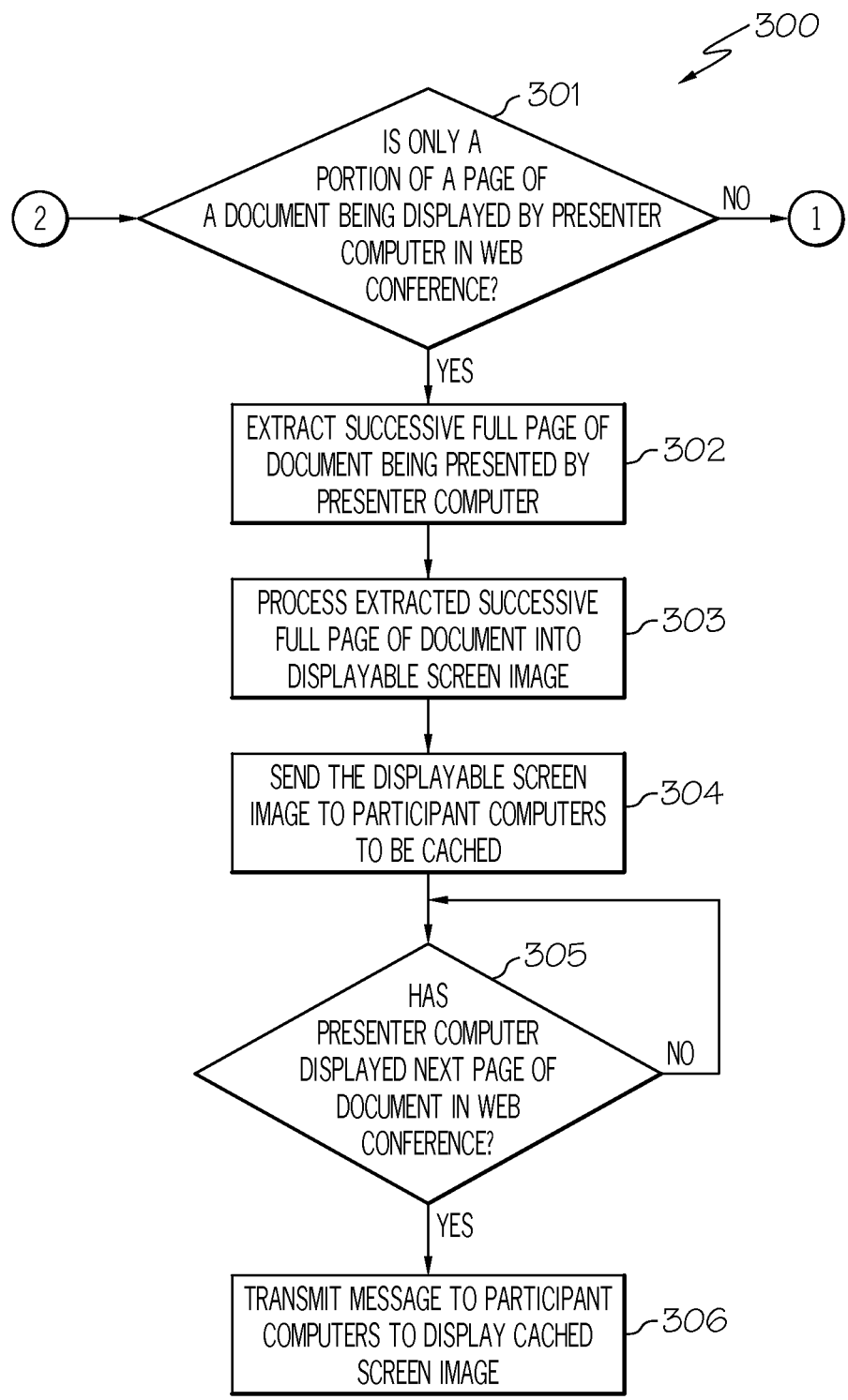
FIGS. 3A-3B are a flowchart of a method for sharing the contents of a presentation in such a manner as to reduce the time lag between when the presenter views the content and when the audience views the same content in accordance with an embodiment of the present invention.
Figure 3B:
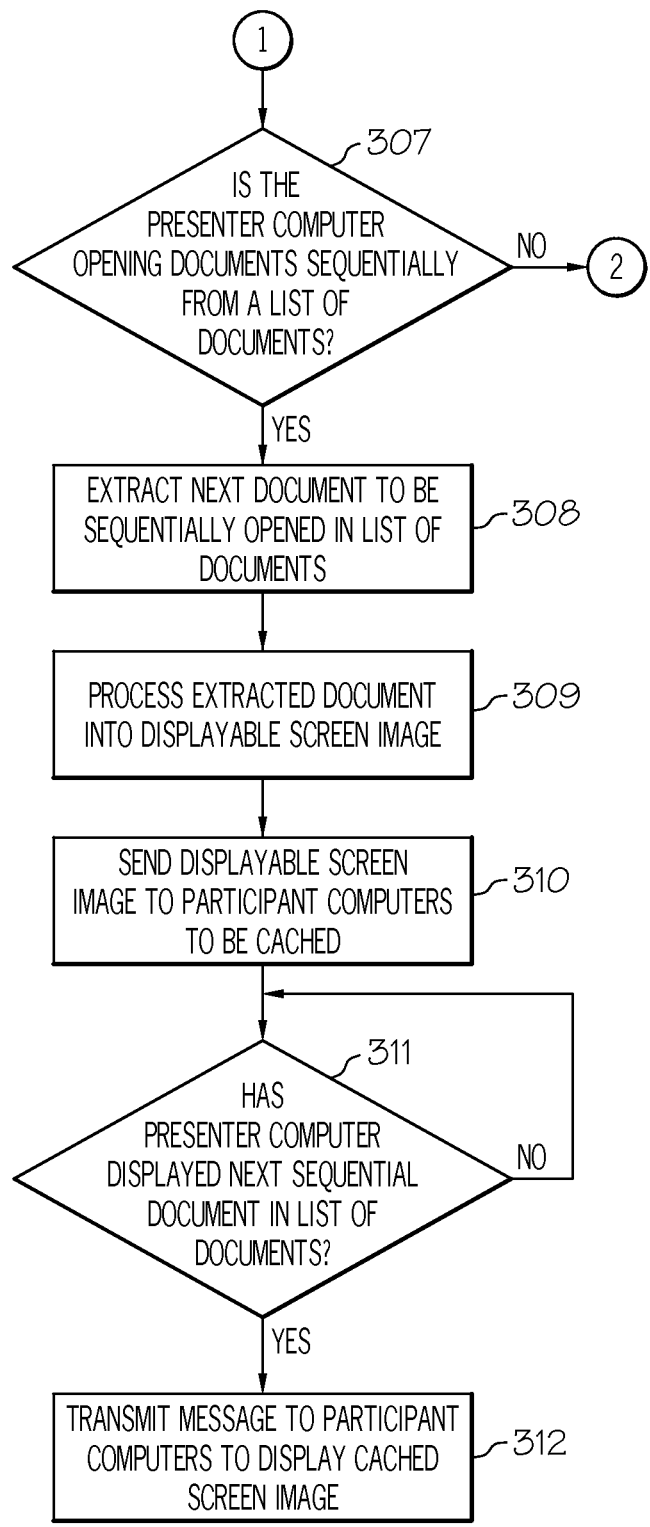
Figure 4:
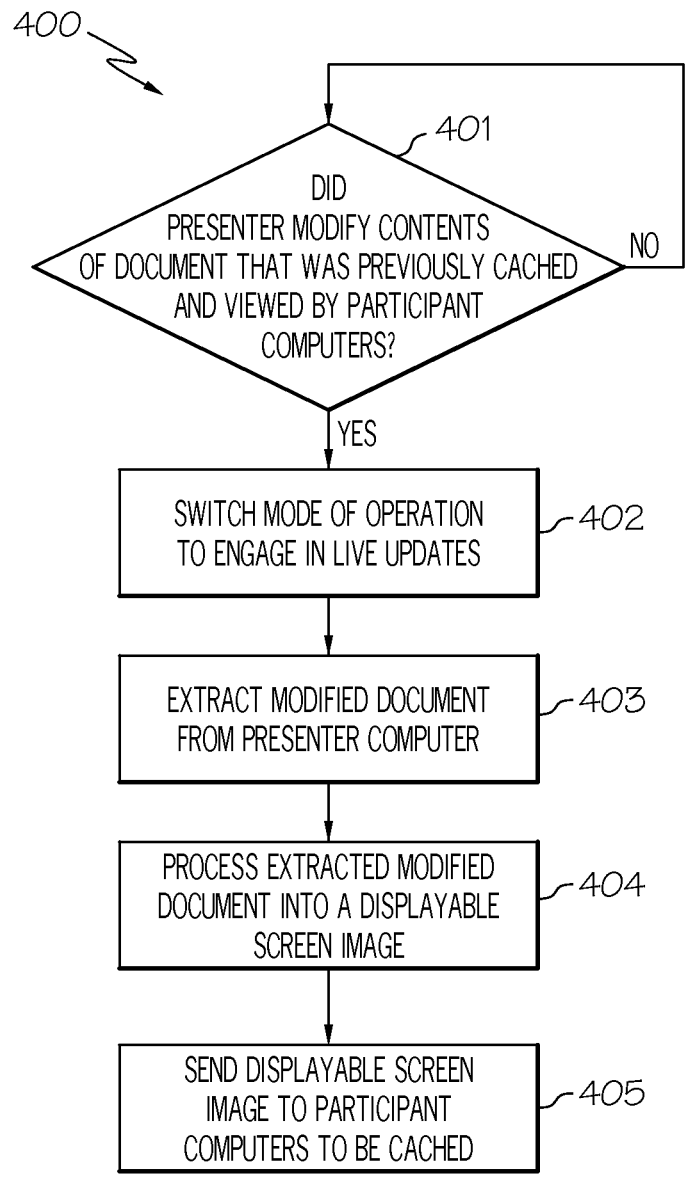
FIG. 4 is a flowchart of a method for handling the situation when the presenter modifies the content of a document currently being viewed by the presenter that was previously cached and viewed by the participant computers in accordance with an embodiment of the present invention.

The principles of the present invention provide a means for reducing the time lag between when the presenter views the content being presented in a web conference and when the audience views it on their computer screens as discussed below in connection with FIGS. 3A-3B and 4. FIGS. 3A-3B are a flowchart of a method for sharing the contents of a presentation in such a manner as to reduce the time lag between when the presenter views the content and when the audience views the same content. FIG. 4 is a flowchart of a method for handling the situation when the presenter modifies the content of the document currently being viewed by the presenter that was previously cached by the participant computers.

Referring to FIGS. 3A-3B, FIGS. 3A-3B are a flowchart of a method 300 for sharing the contents of a presentation in such a manner as to reduce the time lag between when the presenter views the content and when the audience views the same content in accordance with an embodiment of the present invention.

Referring to FIG. 3A, in conjunction with FIGS. 1-2, in step 301, web conference server 101 determines whether only a portion of a page of a document is being displayed by presenter computer 102 in the web conference. In one embodiment, presenter computer 102 may include a web conferencing application that captures an image of the materials currently being presented for broadcast to the participants at participant computers 103 during the web conference. The web conferencing application may transmit this image to the web conference server 101 which includes an application to determine if a portion of a page of a document is currently being displayed. For example, a presenter may be currently viewing the bottom portion of a page in a document, such as a Microsoft® Word document, with a scroll bar. In such a scenario, where there is a high likelihood that the presenter will eventually discuss the successive page in the document, web conference server 101 extracts the successive page and sends it to participant computers 103 to be cached in order for the participants to already have access to it when the presenter views the successive page. In this manner, the time lag between when the presenter views the content (e.g., successive page in the document) and when the audience views the same content is reduced.

If only a portion of a page of a document is being displayed by presenter computer 102 in the web conference, then, in step 302, web conference server 101 extracts the next successive full page of the document being presented by presenter computer 102.

In step 303, web conference server 101 processes the extracted next successive full page of the document into a displayable screen image.

In step 304, web conference server 101 sends the displayable screen image to participant computers 103 to be cached. Once participant computers 103 receive a screen image of the next page of the page currently being viewed by the presenter of presenter computer 102, participant computers 103 cache the screen image of the next page to be viewed in the near future by the participants.

In step 305, web conference server 101 determines whether presenter computer 102 has displayed the next page of the document (referring to the same page as the extracted successive full page) in the web conference.

If presenter computer 102 displayed the next page of the document in the web conference, then, in step 306, web conference server 101 transmits a message to participant computers 103 to display the cached screen image of this page of the document. Since an image of this page of the document has already been cached by participant computers 103, the document will be more quickly viewed by the participants and will reduce the time lag between when the presenter views the next page of the document and when the audience views the same page of the document.

If, however, the presenter has not yet displayed the next page of the document in the web conference, then, web conference server 101 continues to determine whether presenter computer 102 has displayed the next page of the document in the web conference in step 305.

Referring to step 301 in FIG. 3A, if a portion of a page of a document is not being displayed by presenter computer 102 in the web conference, then, referring to FIG. 3B, in conjunction with FIGS. 1-2, in step 307, web conference server 101 determines whether presenter computer 102 is opening documents sequentially from a list of documents (e.g., a list of documents stored in a database). In one embodiment, presenter computer 102 may include a web conferencing application that acquires the source of documents being opened by the presenter as well as the sequence of these documents being opened, such as from a database. The web conferencing application may transmit this information to the web conference server 101 which includes an application to determine if the presenter is opening documents sequentially from a list of documents (e.g., reviewing patents sequentially from a list of patents generated in a patent search). In such a scenario, where there is a high likelihood that the presenter will eventually open the successive document in the list of documents, web conference server 101 extracts the successive document in the list of documents and sends it to participant computers 103 to be cached in order for the participants to already have access to it when the presenter views the successive document. In this manner, the time lag between when the presenter views the content (e.g., successive document in the list of documents) and when the audience views the same content is reduced.

If presenter computer 102 is opening documents sequentially from a list of documents, then, in step 308, web conference server 101 extracts the next successive document to be sequentially opened in the list of documents.

In step 309, web conference server 101 processes the extracted document into a displayable screen image.

In step 310, web conference server 101 sends the displayable screen image to participant computers 103 to be cached. Once participant computers 103 receive a screen image of the next successive document to the document currently being viewed by the presenter of presenter computer 102, participant computers 103 cache the screen image of the next successive document to be viewed in the near future by the participants.

In step 311, web conference server 101 determines whether presenter computer 102 has displayed the next sequential document in the list of documents in the web conference.

If presenter computer 102 displayed the next sequential document in the list of documents during the web conference, then, in step 312, web conference server 101 transmits a message to participant computers 103 to display the cached screen image of the document. Since an image of the document has already been cached by participant computers 103, the document will be more quickly viewed by the participants and will reduce the time lag between when the presenter views the next successive document in the list of documents and when the audience views the same document.

If, however, the presenter has not yet displayed the next successive document in the list of documents, then, web conference server 101 continues to determine whether presenter computer 102 has displayed the next sequential document in the list of documents during the web conference in step 311.

Referring to step 307, if presenter computer 102 is not opening documents sequentially from a list of documents (e.g., a list of documents stored in a database), then, referring to FIG. 3A, web conference server 101 determines whether only a portion of a page of a document is being displayed by presenter computer 102 in the web conference in step 301.

While FIGS. 3A-3B discuss two scenarios involving the display of only a portion of a document or when the presenter is sequentially opening documents from a list of documents, the principles of the present invention may be applied to any scenario involving materials that are likely to be viewed by the presenter during the web conference where it would be advantageous to have such materials cached by the participant computers in order to reduce the time lag between when the materials are viewed by the presenter and viewed by the participants.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

As discussed above, web conference server 101 transmits an image of the materials that are likely to be viewed by the presenter to participant computers 103 to be cached in order for the participants to already have access to it when the presenter views the successive document. However, the presenter may modify the content of the document after it has been cached and viewed by the participants. For example, the presenter may have been viewing the bottom portion of a particular page of a Microsoft® Word document. Web conference server 101 extracts the successive page and sends a displayable screen image of the extracted page to participant computers 103 to be cached. Upon the presenter viewing the next page of the Microsoft® Word document, participant computers 103 view the same page in response to the message received from web conference server 101 indicating to view the cached screen image of the page. The presenter though may now start to modify this page of the Microsoft® Word document. Since the participants are viewing the cached document with no modifications, the participants will not be able to view the modifications. As a result, in such a situation, web conference server 101 switches to a "live" mode of operation as discussed below in connection with FIG. 4 where web conference server 101 enters the mode to send an image of the document currently being shared by the presenter to the audience after the presenter has viewed that document. In other words, web conference server 101 will no longer be extracting contents likely to be viewed by the presenter, but instead, extracting only those contents that have been viewed by the presenter as discussed below in connection with FIG. 4.

FIG. 4 is a flowchart of a method 400 for handling the situation when presenter computer 102 modifies the content of the document currently being viewed by the presenter that was previously cached and viewed by participant computers 103 in accordance with an embodiment of the present invention.

Referring to FIG. 4, in conjunction with FIGS. 1-2, in step 401, web conference server 101 determines whether the presenter modified the contents of the document that was previously cached and viewed by participant computers 103. In one embodiment, presenter computer 102 includes a web conferencing application that captures an image of the materials currently being viewed by the presenter to be broadcasted to the participants at participant computers 103 during the web conference. The web conferencing application may transmit this image to the web conference server 101.

If the presenter modified the contents of the document that was previously cached by participant computers 103, then, in step 402, web conference server 101 switches its mode of operation to engage in live updates. That is, web conference server 101 enters a mode of operation whereby it sends an image of the document being viewed by the presenter to participant computers 103 after the presenter has viewed that document.

In step 403, web conference server 101 extracts the modified document from presenter computer 102.

In step 404, web conference server 101 processes the extracted modified document into a displayable screen image.

In step 405, web conference server 101 sends the displayable screen image to participant computers 102 to be cached. In this manner, the participants will be able to view the document currently being viewed and discussed by the presenter.

Referring to step 401, if, however, web conference server 101 determines that the presenter has not modified the contents of the document that was previously cached by participant computers 103, then, web conference server 101 continues to monitor the image being displayed on presenter computer 102 to see if the presenter modifies the contents of a document that was previously cached and viewed by participant computers 103 in step 401.

While method 400 discusses the presenter modifying a previously cached document that has been viewed by participant computers 103, the principles of the present invention of method 400 may also apply to any individual, including those not attending the web conference, modifying a previously cached document that has not yet been viewed by the participants. For example, if a participant to the web conference modifies a document cached by participant computers 103 but not yet discussed by the presenter, then web conference server 101 (executing steps 403, 404, 405) could extract the modified document from the participant's computer 103, process the extracted modified document into a displayable screen image and send the screen image to all the participant computers 103 to be re-cached.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for sharing the contents of a presentation in a web conference, the method comprising:
   determining whether only a portion of a page of a document is being displayed by a presenter computer in said web conference or determining whether said presenter computer is opening documents sequentially from a list of documents;
   determining, by a web conference server, whether a likelihood of a presenter at said presenter computer will discuss a page or open a document from a list of documents that is successive to a currently viewed page or document, respectively, exceeds a predetermined threshold based on said determination of whether only said portion of said page of said document is being displayed by said presenter computer in said web conference or said determination of whether said presenter computer is opening documents sequentially from said list of documents, respectively;
   extracting said successive full page of said currently viewed page or said successive document from said list of documents in response to said likelihood of said presenter at said presenter computer will discuss said page or open said document from said list of documents that is successive to said currently viewed page or document, respectively, exceeding said predetermined threshold;
   processing said extracted successive page or document into a displayable screen image;
   sending said displayable screen image to each participant computer to be cached; and
   transmitting, by a web conference server, a message to said each participant computer to display said cached displayable screen image in response to a current display thereof by said presenter computer.

2. The method as recited in claim 1 further comprising:
   extracting a modified version of a document corresponding to said cached displayable screen image from said presenter computer in response to said presenter at said presenter computer modifying said document.

3. The method as recited in claim 2 further comprising:
   processing said modified document into a second displayable screen image; and
   sending said second displayable screen image to said each participant computer to be cached.

4. The method as recited in claim 1 further comprising:
   extracting a modified version of a document corresponding to said cached displayable screen image from one of said each participant computer in response to a participant at said one of said each participant computer modifying said document.

5. A computer program product embodied in a computer readable storage medium, wherein the medium does not include a propagating signal, for sharing the contents of a presentation in a web conference, the computer program product comprising the programming instructions for:
   determining whether only a portion of a page of a document is being displayed by a presenter computer in said web conference or determining whether said presenter computer is opening documents sequentially from a list of documents;
   determining whether a likelihood of a presenter at said presenter computer will discuss a page or open a document from a list of documents that is successive to a currently viewed page or document, respectively, exceeds a predetermined threshold based on said determination of whether only said portion of said page of said document is being displayed by said presenter computer in said web conference or said determination of whether said presenter computer is opening documents sequentially from said list of documents, respectively;
   extracting said successive full page of said currently viewed page or said successive document from said list of documents in response to said likelihood of said presenter at said presenter computer will discuss said page or open said document from said list of documents that is successive to said currently viewed page or document, respectively, exceeding said predetermined threshold;

processing said extracted successive page or document into a displayable screen image;

sending said displayable screen image to each participant computer to be cached; and transmitting a message to said each participant computer to display said cached displayable screen image in response to a current display thereof by said presenter computer.

6. The computer program product as recited in claim 5 further comprising the programming instructions for:

extracting a modified version of a document corresponding to said cached displayable screen image from said presenter computer in response to said presenter at said presenter computer modifying said document.

7. The computer program product as recited in claim 6 further comprising the programming instructions for:

processing said modified document into a second displayable screen image; and sending said second displayable screen image to said each participant computer to be cached.

8. The computer program product as recited in claim 5 further comprising the programming instructions for:

extracting a modified version of a document corresponding to said cached displayable screen image from one of said each participant computer in response to a participant at said one of said each participant computer modifying said document.

9. A system, comprising:

a memory unit for storing a computer program for sharing the contents of a presentation in a web conference; and a processor coupled to said memory unit, wherein said processor, responsive to said computer program, comprises:

circuitry for determining whether only a portion of a page of a document is being displayed by a presenter computer in said web conference or determining whether said presenter computer is opening documents sequentially from a list of documents;

circuitry for determining whether a likelihood of a presenter at said presenter computer will discuss a page or open a document from a list of documents that is successive to a currently viewed page or document, respectively, exceeds a predetermined threshold based on said determination of whether only said portion of said page of said document is being displayed by said presenter computer in said web conference or said determination of whether said presenter computer is opening documents sequentially from said list of documents, respectively;

circuitry for extracting said successive full page of said currently viewed page or said successive document from said list of documents in response to said likelihood of said presenter at said presenter computer will discuss said page or open said document from said list of documents that is successive to said currently viewed page or document, respectively, exceeding said predetermined threshold;

circuitry for processing said extracted successive page or document into a displayable screen image;

circuitry for sending said displayable screen image to each participant computer to be cached; and circuitry for transmitting a message to said each participant computer to display said cached displayable screen image in response to a current display thereof by said presenter computer.

10. The system as recited in claim 9, wherein said processor further comprises:

circuitry for extracting a modified version of a document corresponding to said cached displayable screen image from said presenter computer in response to said presenter at said presenter computer modifying said document.

11. The system as recited in claim 10, wherein said processor further comprises:

circuitry for processing said modified document into a second displayable screen image; and circuitry for sending said second displayable screen image to said each participant computer to be cached.

12. The system as recited in claim 9, wherein said processor further comprises:

circuitry for extracting a modified version of a document corresponding to said cached displayable screen image from one of said each participant computer in response to a participant at said one of said each participant computer modifying said document.

* * * * *